US011231785B2

(12) United States Patent
Cho et al.

(10) Patent No.: US 11,231,785 B2
(45) Date of Patent: Jan. 25, 2022

(54) DISPLAY DEVICE AND USER INTERFACE DISPLAYING METHOD THEREOF

(71) Applicant: SAMSUNG ELECTRONICS CO., LTD., Suwon-si (KR)

(72) Inventors: Eun Nim Cho, Suwon-si (KR); Yu Hyeon Jun, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 166 days.

(21) Appl. No.: 15/906,255

(22) Filed: Feb. 27, 2018

(65) Prior Publication Data
US 2018/0253221 A1  Sep. 6, 2018

(30) Foreign Application Priority Data

Mar. 2, 2017  (KR) .................. 10-2017-0027101

(51) Int. Cl.
G06F 3/0484 (2013.01)
G06F 3/01 (2006.01)
(Continued)

(52) U.S. Cl.
CPC ............ *G06F 3/017* (2013.01); *G06F 3/0481* (2013.01); *G06F 3/0482* (2013.01);
(Continued)

(58) Field of Classification Search
CPC .. G06F 3/04847; G06F 3/0414; G06F 3/0482; G06F 3/017; G06F 3/0481;
(Continued)

(56) References Cited

U.S. PATENT DOCUMENTS 5,825,363 A * 10/1998 Anderson ............... G06T 15/10
345/422
6,567,102 B2 * 5/2003 Kung ................... G06F 3/0481
345/173
(Continued)

FOREIGN PATENT DOCUMENTS

KR  10-2010-0127382 A  12/2010
KR  10-2014-0036576 A  3/2014
(Continued)

OTHER PUBLICATIONS

Communication dated Jul. 18, 2018, from the European Patent Office in counterpart European Application No. 18159565.3.
(Continued)

*Primary Examiner* — Jung-Mu T Chuang
(74) *Attorney, Agent, or Firm* — Sughrue Mion, PLLC

(57) ABSTRACT

A display device includes a display, a bezel disposed along a periphery of the display, a touch sensor disposed inward of the bezel and configured to receive, from a user, a first touch input at a touch location of the touch sensor, and a processor configured to control the display to display a user interface at a first location of the display. The processor is further configured to, in response to the first touch input being received while the user interface is displayed at the first location, determine a user location of the user, based on the touch location at which the first touch input is received, and control the display to move the user interface that is displayed, to a second location of the display, the second location corresponding to the user location that is determined.

14 Claims, 11 Drawing Sheets

(51) Int. Cl.
*G06F 3/0482* (2013.01)
*H04N 21/422* (2011.01)
*H04N 21/431* (2011.01)
*H04N 21/442* (2011.01)
*G06F 3/0488* (2013.01)
*H04N 21/47* (2011.01)
*G06F 3/0481* (2013.01)

(52) U.S. Cl.
CPC ...... *G06F 3/04845* (2013.01); *G06F 3/04847* (2013.01); *G06F 3/04886* (2013.01); *H04N 21/422* (2013.01); *H04N 21/431* (2013.01); *H04N 21/4312* (2013.01); *H04N 21/44218* (2013.01); *H04N 21/47* (2013.01); *G06F 2203/0339* (2013.01)

(58) Field of Classification Search
CPC ............. G06F 3/04845; G06F 3/04886; G06F 2203/0339; H04N 21/422; H04N 21/431; H04N 21/4312; H04N 21/44218; H04N 21/47
See application file for complete search history.

(56) References Cited

U.S. PATENT DOCUMENTS

| | | | | |
|---|---|---|---|---|
| 7,154,544 | B2* | 12/2006 | Kowno | H04N 5/23293 348/240.99 |
| RE40,891 | E* | 9/2009 | Yasutake | G06F 3/0338 178/18.01 |
| 7,656,393 | B2 | 2/2010 | King et al. | |
| 7,814,419 | B2* | 10/2010 | Fabritius | G06F 1/1626 715/702 |
| 8,072,439 | B2* | 12/2011 | Hillis | G06F 3/017 345/173 |
| 8,166,421 | B2* | 4/2012 | Magal | A61B 8/08 382/218 |
| 8,259,117 | B2* | 9/2012 | Shuster | G06T 13/20 345/474 |
| 8,289,316 | B1* | 10/2012 | Reisman | G06F 3/04883 345/419 |
| 8,351,773 | B2* | 1/2013 | Nasiri | A63F 13/06 396/55 |
| 8,453,055 | B2 | 5/2013 | Oh | |
| 8,493,342 | B2* | 7/2013 | Park | G06F 1/1626 345/173 |
| 8,578,294 | B2* | 11/2013 | Eom | G06F 3/0482 715/769 |
| 8,656,314 | B2* | 2/2014 | Locker | G06F 3/04883 715/863 |
| 8,683,390 | B2* | 3/2014 | de los Reyes | G06F 3/04886 715/863 |
| 8,780,082 | B2* | 7/2014 | Bernstein | G06F 3/0482 345/174 |
| 8,882,590 | B2* | 11/2014 | Shimura | A63F 13/10 463/31 |
| 8,910,079 | B2* | 12/2014 | Yoo | G06F 3/04817 715/800 |
| 8,952,779 | B2* | 2/2015 | Sugaya | H04N 21/4126 340/5.1 |
| 9,047,009 | B2 | 6/2015 | King | G06F 1/169 |
| 9,098,117 | B2 | 8/2015 | Lutz | G06F 1/1618 |
| 9,158,766 | B2* | 10/2015 | Blyumen | G06F 3/04884 |
| 9,164,625 | B2* | 10/2015 | Holmgren | A63F 13/31 |
| 9,229,625 | B2* | 1/2016 | Nancke-Krogh | G06F 3/04842 |
| 9,244,545 | B2* | 1/2016 | Hinckley | G06F 3/038 |
| 9,310,993 | B2* | 4/2016 | Choi | G06F 3/0482 |
| 9,310,994 | B2* | 4/2016 | Hinckley | G06F 3/0483 |
| 9,360,965 | B2* | 6/2016 | Krulce | G06F 3/0488 |
| 9,367,205 | B2* | 6/2016 | Hinckley | G06F 3/0482 |
| 9,377,884 | B2* | 6/2016 | Christiansson | G06F 3/0421 |
| 9,389,703 | B1* | 7/2016 | Olsen | G06F 3/0346 |
| 9,477,331 | B2* | 10/2016 | Westerman | G06F 3/04186 |
| 9,507,459 | B2* | 11/2016 | Ledet | G06F 3/0488 |
| 9,582,122 | B2* | 2/2017 | Bathiche | G06F 3/0488 |
| 9,658,766 | B2* | 5/2017 | Nan | G06F 3/04886 |
| 9,681,044 | B2* | 6/2017 | Homma | G06T 3/4053 |
| 9,740,367 | B2* | 8/2017 | Lin | G06F 3/04817 |
| 9,785,291 | B2* | 10/2017 | Tenuta | G06F 3/044 |
| 9,898,130 | B2* | 2/2018 | Chin | G06F 3/0416 |
| 9,973,690 | B2* | 5/2018 | Homma | G06T 3/4053 |
| 9,983,742 | B2 | 5/2018 | King et al. | |
| 10,168,827 | B2* | 1/2019 | Hinckley | G06F 3/04883 |
| 10,168,886 | B2* | 1/2019 | Kim | G06F 3/0488 |
| 10,261,674 | B2* | 4/2019 | Paek | G06F 3/04842 |
| 10,268,367 | B2* | 4/2019 | Hinckley | G06F 3/04817 |
| 10,521,109 | B2* | 12/2019 | Beaver | G06F 3/041 |
| 10,656,752 | B1* | 5/2020 | Smith | G06F 3/04815 |
| 2002/0093578 | A1* | 7/2002 | Kowno | H04N 5/23296 348/241 |
| 2002/0101457 | A1* | 8/2002 | Lang | G06F 1/163 715/856 |
| 2002/0180763 | A1* | 12/2002 | Kung | G06F 3/0488 345/660 |
| 2005/0114788 | A1* | 5/2005 | Fabritius | G06F 1/1626 715/767 |
| 2006/0007169 | A1* | 1/2006 | Robbins | G06F 3/0224 345/173 |
| 2006/0064642 | A1* | 3/2006 | Iyer | G06F 40/103 715/730 |
| 2006/0238517 | A1* | 10/2006 | King | G06F 3/03547 345/173 |
| 2008/0249682 | A1* | 10/2008 | Wisniewski | B60K 35/00 701/36 |
| 2009/0059730 | A1* | 3/2009 | Lyons | G04G 21/08 368/69 |
| 2009/0143141 | A1* | 6/2009 | Wells | G07F 17/3237 463/37 |
| 2009/0183125 | A1* | 7/2009 | Magal | G06F 3/017 715/863 |
| 2009/0193359 | A1* | 7/2009 | Anthony | H04N 1/00461 715/804 |
| 2009/0213086 | A1* | 8/2009 | Chae | G06F 3/0482 345/173 |
| 2009/0295753 | A1* | 12/2009 | King | G06F 1/1643 345/174 |
| 2009/0325686 | A1* | 12/2009 | Davis | G07F 17/32 463/25 |
| 2010/0083111 | A1* | 4/2010 | de los Reyes | G06F 3/04886 715/702 |
| 2010/0085317 | A1* | 4/2010 | Park | G06F 1/1626 345/173 |
| 2010/0088641 | A1* | 4/2010 | Choi | G06F 3/04883 715/828 |
| 2010/0306650 | A1* | 12/2010 | Oh | G06F 3/0482 715/702 |
| 2011/0022991 | A1* | 1/2011 | Hillis | G06F 3/017 715/863 |
| 2011/0029934 | A1* | 2/2011 | Locker | G06F 3/04883 715/863 |
| 2011/0069019 | A1* | 3/2011 | Carpendale | G06F 3/04883 345/173 |
| 2011/0102345 | A1* | 5/2011 | Kim | G06F 3/044 345/173 |
| 2011/0163955 | A1* | 7/2011 | Nasiri | A63F 13/06 345/158 |
| 2011/0209093 | A1* | 8/2011 | Hinckley | G06F 3/0482 715/834 |
| 2011/0209097 | A1* | 8/2011 | Hinckley | G06F 3/04883 715/863 |
| 2011/0283188 | A1* | 11/2011 | Farrenkopf | G06F 3/04855 715/702 |
| 2011/0316888 | A1* | 12/2011 | Sachs | G06F 1/1626 345/667 |
| 2012/0242652 | A1* | 9/2012 | Kim | G06F 3/016 345/419 |
| 2012/0274662 | A1* | 11/2012 | Kim | G06F 3/0414 345/650 |

(56) References Cited

U.S. PATENT DOCUMENTS

| | | | |
|---|---|---|---|
| 2012/0280900 A1* | 11/2012 | Wang | G06F 3/0488 345/156 |
| 2012/0304133 A1* | 11/2012 | Nan | G06F 3/04886 715/863 |
| 2013/0033448 A1* | 2/2013 | Yano | G06F 3/0235 345/173 |
| 2013/0033525 A1* | 2/2013 | Markiewicz | G06F 3/04883 345/684 |
| 2013/0067398 A1* | 3/2013 | Pittappilly | G06F 3/04883 715/800 |
| 2013/0159915 A1* | 6/2013 | Kim | G06F 3/0483 715/776 |
| 2013/0176245 A1* | 7/2013 | Kwon | G06F 3/041 345/173 |
| 2013/0239063 A1* | 9/2013 | Ubillos | H04L 51/24 715/838 |
| 2013/0254693 A1* | 9/2013 | Oh | G06F 3/0482 715/769 |
| 2013/0268875 A1* | 10/2013 | Han | G06F 3/0482 715/769 |
| 2013/0298014 A1* | 11/2013 | Kodimer | H04N 1/00411 715/251 |
| 2014/0082554 A1* | 3/2014 | Iwaniszczuk | G06F 3/0483 715/823 |
| 2014/0109012 A1* | 4/2014 | Choudhary | G06F 3/0483 715/838 |
| 2014/0132551 A1* | 5/2014 | Bathiche | G06F 3/04883 345/174 |
| 2014/0149947 A1* | 5/2014 | Blyumen | G06F 16/00 715/863 |
| 2014/0165013 A1* | 6/2014 | Chuang | G06F 3/04883 715/863 |
| 2014/0181739 A1* | 6/2014 | Yoo | G06F 3/14 715/800 |
| 2014/0306905 A1* | 10/2014 | Kim | G06F 3/04886 345/173 |
| 2014/0310653 A1 | 10/2014 | Han | |
| 2014/0359539 A1* | 12/2014 | Locker | G06F 3/0488 715/863 |
| 2014/0362001 A1* | 12/2014 | Westerman | G06F 3/0488 345/173 |
| 2015/0105151 A1* | 4/2015 | Franzas | A63F 13/45 463/31 |
| 2015/0160849 A1* | 6/2015 | Weiss | G06F 3/044 345/174 |
| 2015/0261362 A1 | 9/2015 | King et al. | |
| 2016/0048373 A1* | 2/2016 | Weil | G06F 3/167 715/752 |
| 2016/0085438 A1* | 3/2016 | Doan | G06F 3/04883 715/863 |
| 2016/0098184 A1* | 4/2016 | Kim | G06F 3/0488 715/786 |
| 2016/0171655 A1* | 6/2016 | Homma | G06T 3/4053 348/222.1 |
| 2016/0259472 A1* | 9/2016 | Ledet | G06F 3/0488 |
| 2016/0259481 A1* | 9/2016 | Lee | G02F 1/133345 |
| 2016/0259525 A1 | 9/2016 | Li et al. | |
| 2016/0283104 A1* | 9/2016 | Hinckley | G06F 3/04817 |
| 2016/0299632 A1 | 10/2016 | Liu et al. | |
| 2016/0349958 A1* | 12/2016 | Hyun | G06F 3/0481 |
| 2017/0003854 A1* | 1/2017 | Lin | G06F 3/04817 |
| 2017/0083141 A1* | 3/2017 | Milam | G06F 3/0414 |
| 2017/0230572 A1* | 8/2017 | Homma | H04N 5/23232 |
| 2017/0285834 A1* | 10/2017 | Chin | G06F 3/0412 |
| 2018/0039951 A1* | 2/2018 | Wynn | H04N 7/15 |
| 2018/0088781 A1* | 3/2018 | Kodisoja | A63F 13/80 |
| 2018/0253172 A1 | 9/2018 | King et al. | |
| 2018/0253221 A1* | 9/2018 | Cho | G06F 3/017 |
| 2018/0349008 A1* | 12/2018 | Manzari | H04N 5/23222 |

FOREIGN PATENT DOCUMENTS

| | | |
|---|---|---|
| KR | 10-2014-0122662 A | 10/2014 |
| KR | 10-2016-0069909 A | 6/2016 |

OTHER PUBLICATIONS

Communication dated Feb. 22, 2021 issued by the Korean Intellectual Property Office in counterpart Korean Application No. 10-2017-0027101.

* cited by examiner

DISPLAY DEVICE AND USER INTERFACE DISPLAYING METHOD THEREOF

CROSS-REFERENCE TO RELATED APPLICATION

This application claims priority from Korean Patent Application No. 10-2017-0027101 filed on Mar. 2, 2017, in the Korean Intellectual Property Office, the disclosure of which is incorporated herein by reference in its entirety.

BACKGROUND

1. Field

Apparatuses and methods consistent with example embodiments relate to a method for displaying a user interface and changing a location of the user interface.

2. Description of Related Art

Various forms of electronic products have been developed and widely used with the development of electronic technologies. Especially, in recent years, electronic devices (such as TV, a monitor, an electronic picture frame, an electronic board, a smartphone, and the like) that include a display have been widely used, and with the development of display technologies, the displays included in the electronic devices have become larger.

Various types of services, such as broadcasting, e-mail, music/video reproduction, social network service (SNS), messaging service, game, and the like, are provided through multi-functional electronic devices. To support the above-described various functions, technologies for interactions between electronic devices and users have also been developed, and touch screens capable of receiving users' intuitive inputs to contents displayed on displays have been widely used.

An electronic device including a large screen display may display a large amount of information. However, in the case in which a user interacts with the electronic device by using a touch screen, the user at a fixed location has difficulty in interacting with all user interfaces displayed on a display of the electronic device.

SUMMARY

A display device and a user interface displaying method thereof are provided for moving a user interface displayed on a display according to a user's location and changing the form of the user interface according to a user input.

According to example embodiments, there is provided a display device including a housing configured to form an external appearance of the display device, a display exposed through the housing, a bezel configured to form a part of the housing and disposed along a periphery of the display, a touch sensor disposed inward of the bezel and configured to receive, from a user, a first touch input at a touch location of the touch sensor, and a processor configured to control the display to display a user interface at a first location of the display. The processor is further configured to, in response to the first touch input being received while the user interface is displayed at the first location, determine a user location of the user, based on the touch location at which the first touch input is received, and control the display to move the user interface that is displayed, to a second location of the display, the second location corresponding to the user location that is determined.

The user interface may include a plurality of objects, and the processor may be further configured to, in response to the first touch input being received while the user interface is displayed at the first location, control the display to change a direction in which the plurality of objects are arranged, to allow the plurality of objects to correspond to the second location.

The user interface may include a plurality of objects, and the processor may be further configured to, in response to the first touch input being received while the user interface is displayed at the first location, control the display to change either one or both of an interval between the plurality of objects and a sequence in which the plurality of objects are arranged, based on a time duration of the first touch input that is received.

The user interface may include a first user interface and a second user interface, and the processor may be further configured to, in response to the first touch input being received while the user interface is displayed at the first location, control the display to display a first portion of the first user interface overlapping a second portion of the second user interface, and display the second portion of the second user interface overlapping the first portion of the first user interface, based on a time duration of the first touch input that is received.

The user interface may include a plurality of objects, and the processor may be further configured to, in response to the first touch input being received while the user interface is displayed at the first location, control the display to display an additional object relating to the user interface or a sub-user interface of the user interface, in response to a first time duration of the first touch input that is received exceeding a threshold time duration.

The display device may further include a pressure sensor disposed inward of the bezel and configured to detect a strength of the first touch input, the user interface may include a plurality of objects, and the processor may be further configured to, in response to the first touch input being received while the user interface is displayed at the first location, control the display to change either one or both of an interval between the plurality of objects and a sequence in which the plurality of objects are arranged, based on the strength of the first touch input that is detected.

The display device may further include a pressure sensor disposed inward of the bezel and configured to detect a strength of the first touch input, the user interface may include a first user interface and a second user interface, and the processor may be further configured to, in response to the first touch input being received while the user interface is displayed at the first location, control the display to display a first portion of the first user interface overlapping a second portion of the second user interface, and display the second portion of the second user interface overlapping the first portion of the first user interface, based on the strength of the first touch input that is detected.

The user interface may include a first user interface and a second user interface, and the processor may be further configured to, in response to the first touch input being received while the user interface is displayed at the first location, control the display to move a most recently displayed user interface among the first user interface and the second user interface, to the second location.

The touch sensor may be further configured to receive, from the user, a second touch input, and the processor may be further configured to, in response to the second touch input being received while the user interface is displayed at the second location, control the display to move the user interface that is displayed, to the first location.

The display device may further include a motion recognition sensor configured to detect a first gesture and a second gesture of the user, and the processor may be further configured to control the display to, in response to the first gesture being detected while the user interface is displayed at the first location, move the user interface that is displayed, to the second location, and in response to the second gesture being detected while the user interface is displayed at the second location, move the user interface that is displayed, to the first location.

The user interface may include a plurality of objects, and the processor may be further configured to, in response to the first gesture being detected while the user interface is displayed at the first location, determine either one or both of an interval between the plurality of objects and a sequence in which the plurality of objects are arranged, based on a time duration of the first gesture that is detected.

The user interface may include a first user interface and a second user interface, and the processor may be further configured to, in response to the first gesture being detected while the user interface is displayed at the first location, control the display to display a first portion of the first user interface overlapping a second portion of the second user interface, and display the second portion of the second user interface overlapping the first portion of the first user interface, based on a time duration of the first gesture that is detected.

According to example embodiments, there is provided a user interface displaying method of a display device, the method including displaying a user interface at a first location of a display, receiving, from a user, a first touch input at a touch location of a touch sensor disposed inward of a bezel that forms a part of a housing forming an external appearance of the display device, the bezel being disposed along a periphery of the display, and in response to the first touch input being received while the user interface is displayed at the first location, determining a user location of the user, based on the touch location at which the first touch input is received, and moving the user interface that is displayed, to a second location of the display, the second location corresponding to the user location that is determined.

The user interface may include a plurality of objects, and the method may further include, in response to the first touch input being received while the user interface is displayed at the first location, changing a direction in which the plurality of objects are arranged, to allow the plurality of objects to correspond to the second location.

The user interface may include a plurality of objects, and the method may further include, in response to the first touch input being received while the user interface is displayed at the first location, changing either one or both of an interval between the plurality of objects and a sequence in which the plurality of objects are arranged, based on a time duration of the first touch input that is received.

The user interface may include a first user interface and a second user interface, and the method may further include, in response to the first touch input being received while the user interface is displayed at the first location, displaying a first portion of the first user interface overlapping a second portion of the second user interface, and displaying the second portion of the second user interface overlapping the first portion of the first user interface, based on a time duration of the first touch input that is received.

The user interface may include a plurality of objects, and the method may further include, in response to the first touch input being received while the user interface is displayed at the first location, displaying an additional object relating to the user interface or a sub-user interface of the user interface, in response to a first time duration of the first touch input that is received exceeding a threshold time duration.

The user interface may include a plurality of objects, and the method may further include detecting a strength of the first touch input through a pressure sensor disposed inward of the bezel, and in response to the first touch input being received while the user interface is displayed at the first location, changing either one or both of an interval between the plurality of objects and a sequence in which the plurality of objects are arranged, based on the strength of the first touch input that is detected.

The user interface may include a first user interface and a second user interface, and the method may further include detecting a strength of the first touch input through a pressure sensor disposed inward of the bezel, and in response to the first touch input being received while the user interface is displayed at the first location, displaying a first portion of the first user interface overlapping a second portion of the second user interface, and displaying the second portion of the second user interface overlapping the first portion of the first user interface, based on the strength of the first touch input that is detected.

According to example embodiments, there is provided a non-transitory computer-readable storage medium storing a program including instructions to cause a processor to perform a user interface displaying method of a display device, the method including displaying a user interface at a first location of a display, receiving, from a user, a first touch input at a touch location of a touch sensor disposed inward of a bezel that forms a part of a housing forming an external appearance of the display device, the bezel being disposed along a periphery of the display, and in response to the first touch input being received while the user interface is displayed at the first location, determining a user location of the user, based on the touch location at which the first touch input is received, and moving the user interface that is displayed, to a second location of the display, the second location corresponding to the user location that is determined.

According to example embodiments, there is provided a display device including a display, a bezel disposed along a periphery of the display, a touch sensor disposed below the bezel and configured to receive, from a user, a touch input at a touch location of the bezel, and a processor configured to control the display to display a user interface at a first location of the display, and in response to the touch input being received while the user interface is displayed at the first location, determine a user location of the user, and control the display to move the user interface that is displayed, to a second location of the display, the second location corresponding to the user location that is determined.

The display device may further include a thermal sensor configured to detect the user location, and the processor may be further configured to determine the user location, based on the user location that is detected.

The user interface may include a plurality of objects, and the processor may be further configured to, in response to the touch input being received while the user interface is displayed at the first location, control the display to change an interval between the plurality of objects, based on a time duration of the touch input that is received.

The user interface may include a plurality of objects, and the processor may be further configured to, in response to the touch input being received while the user interface is displayed at the first location, control the display to change a sequence in which the plurality of objects are arranged, based on a time duration of the touch input that is received.

BRIEF DESCRIPTION OF THE DRAWINGS

The above and other aspects and features of example embodiments of the present disclosure will be more apparent from the following description taken in conjunction with the accompanying drawings, in which.

DETAILED DESCRIPTION OF THE EXAMPLE EMBODIMENTS

Figure 1:
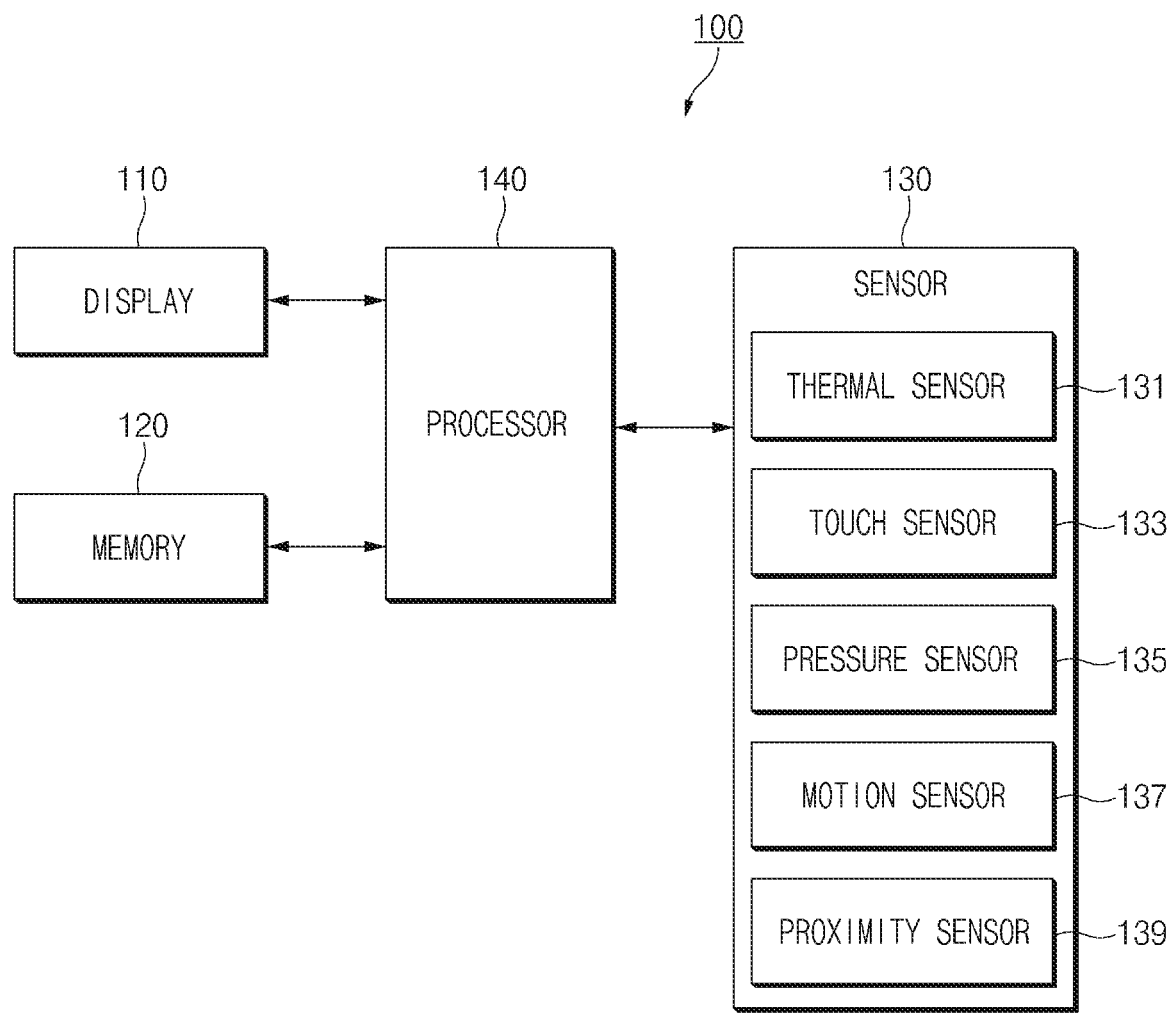
FIG. 1 is a block diagram illustrating a configuration of a display device according to example embodiments.

Hereinafter, example embodiments will be described with reference to the accompanying drawings. However, those of ordinary skill in the art will recognize that modifications, equivalents, and/or alternatives on the example embodiments described herein can be variously made without departing from the scope and spirit of the present disclosure. With regard to description of drawings, similar elements may be marked by similar reference numerals.

FIG. 1 is a block diagram illustrating a configuration of a display device according to example embodiments.

Referring to FIG. 1, a display device 100 may include a display 110, a memory 120, a sensor 130, and a processor 140. According to example embodiments, the display device 100 may include, for example, a device (such as a large screen TV, an electronic board, or the like) that includes a large screen display having a specified size (e.g., 50 inches) or more, or a multi-vision or a video wall that implements a large screen display by connecting a plurality of displays.

According to example embodiments, the display 110 may display a user interface. The user interface may include, for example, at least one object for interacting with a user. For example, the at least one object may be a menu that includes text, an icon, and/or an image.

According to example embodiments, the memory 120 may store the user interface. According to example embodiments, the memory 120 may store location information of the user interface. For example, the memory 120 may store information about the location where the user interface is to be displayed first on the display 110. According to example embodiments, the memory 120 may store the user's location information.

According to example embodiments, the sensor 130 may detect the user or a user input. For example, the sensor 130 may detect the user's location, the distance between display device 100 and the user, and/or the user's height, and/or may detect the user's touch input or the user's motion (or gesture), by using a plurality of sensors.

According to example embodiments, the sensor 130 may include a thermal sensor 131, a touch sensor 133, a pressure sensor 135, a motion sensor 137, and a proximity sensor 139. According to example embodiments, the sensor 130 may include a separate processor (or a sensor hub) for processing information detected by the sensors.

According to example embodiments, the thermal sensor 131 may detect the user's location. The thermal sensor 131 may take an infrared thermal image by using an infrared camera and may detect the user's location on the basis of the infrared thermal image. For example, the thermal sensor 131 may identify the user's body included in the infrared thermal image and may determine the user's location on the basis of the location (or coordinates) and size of the user's body included in the infrared thermal image. For example, in the case in which the user's body is located on a right side of the infrared thermal image, the thermal sensor 131 may determine that the user is located at the left (with respect to the direction in which the user views the display 110), and in the case in which the user's body is located on a left side of the infrared thermal image, the thermal sensor 131 may determine that the user is located at the right (with respect to the direction in which the user views the display 110). In another example, with an increase in the size of the user's body included in the infrared thermal image, the thermal sensor 131 may determine that the user is located closer to the display 110, and with a decrease in the size of the user's body included in the infrared thermal image, the thermal sensor 131 may determine that the user is located further away from the display 110.

According to example embodiments, the touch sensor 133 may receive the user's touch input or hovering (or proximity touch) input. The touch sensor 133 may include, for example, a resistive touch sensor, a capacitive touch sensor, an infrared touch sensor, or an ultrasonic touch sensor. According to example embodiments, in the case of the user's hovering input, the capacitive touch sensor 133 may detect the distance between the user's body (e.g., finger) and the touch sensor 133. According to example embodiments, the sensor 130 may include a plurality of touch sensors. For example, the sensor 130 may include a first touch sensor disposed on a display panel to receive a touch input on the display 110 and a second touch sensor disposed inward of (or below) a bezel, which is disposed at the periphery of the display 110, to receive a touch input to the bezel. Hereinafter, the structure of the bezel including the touch sensor 133 (e.g., the second touch sensor) will be described with reference to FIG. 2.

Figure 2:
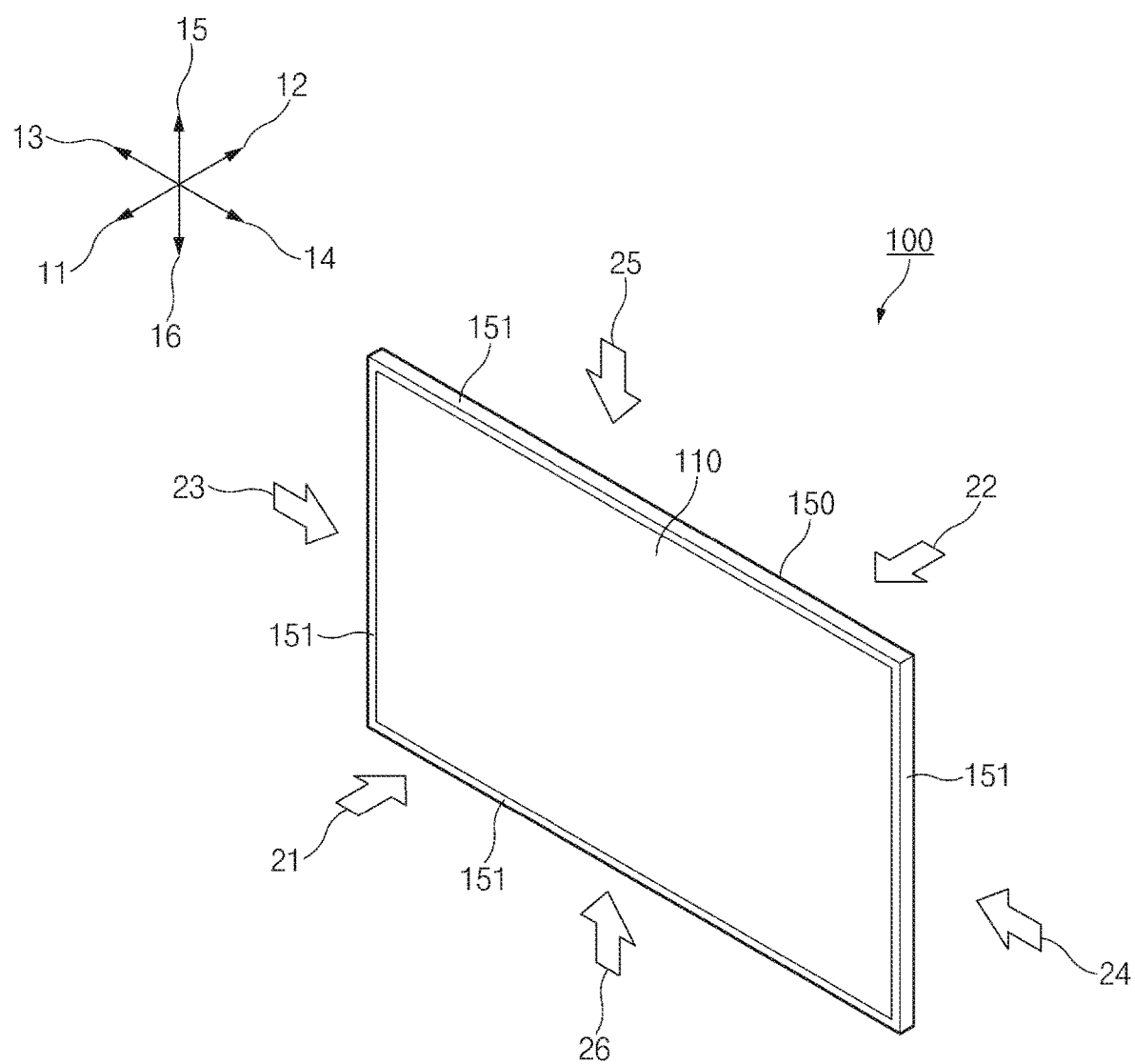
FIG. 2 is a perspective view illustrating an external appearance of a display device according to example embodiments.

FIG. 2 is a perspective view illustrating an external appearance of a display device according to example embodiments.

Referring to FIG. 2, the display device 100 may include the display 110 (or display device) and a housing 150.

Various circuits or modules, such as a processor, a memory, and the like, may be disposed inside the display device 100 (or inside the housing 150).

According to example embodiments, the housing 150 may form at least a part of the external appearance of the display device 100. For example, the housing 150 may include a front surface 21 facing a first direction 11, a rear surface 22 opposite to the front surface 21 and facing a second direction 12, and side surfaces surrounding at least a space between the front surface 21 and the rear surface 22. The side surfaces may include a left side surface 23 facing a third direction 13 (or the left-side direction), a right side surface 24 facing a fourth direction 14 (or the right-side direction), an upper side surface 25 facing a fifth direction 15 (or the upper-side direction), and a lower side surface 26 facing a sixth direction 16 (or the lower-side direction). According to example embodiments, the housing 150 may be formed of a plastic injection-molded material, a conductive material (e.g., metal), or a combination thereof to protect various components inside the display device 100 from external shocks or dust.

According to example embodiments, the display 110 may be disposed on the front surface 21 of the display device 100 (or the housing 150). For example, the display 110 may be disposed between the front surface 21 and the rear surface 22 and may be exposed to the outside through the front surface 21.

According to example embodiments, the housing 150 may include a bezel 151. According to example embodiments, the bezel 151 may form a part of the housing 150 and may be formed at the periphery of the display 110. The bezel 151 may correspond to, for example, the front surface 21, the left side surface 23, the right side surface 24, the upper side surface 25, and the lower side surface 26 of the housing 150.

Referring again to FIG. 1, according to example embodiments, the pressure sensor 135 may detect the strength (or pressure) of a user's touch input. The pressure sensor 135 may include, for example, a capacitive pressure sensor. According to example embodiments, the sensor 130 may include a plurality of pressure sensors. For example, the sensor 130 may include a first pressure sensor disposed below a display panel to detect the strength of a touch input on the display 110 and a second pressure sensor disposed inward of (or below) the bezel 151, which is disposed at the periphery of the display 110, to detect the strength of a touch input to the bezel 151.

According to example embodiments, the motion sensor 137 (or gesture sensor) may recognize the user's motion (or gesture). For example, the motion sensor 137 may take an image of the user by using a camera and may recognize the user's motion included in the image.

According to example embodiments, the proximity sensor 139 may detect the distance from the user or a part of the user's body. The proximity sensor 139 may include, for example, an ultrasonic or capacitive proximity sensor. According to example embodiments, the sensor 130 may include a plurality of proximity sensors. For example, the sensor 130 may include a plurality of proximity sensors disposed at a plurality of points of the display device 100.

According to example embodiments, the processor 140 may control an overall operation of the display device 100. For example, the processor 140 may control the display 110, the memory 120, and the sensor 130 to display a user interface on the display 110 according to example embodiments.

According to example embodiments, the display device 100 may include at least one (e.g., a plurality of) processor(s). According to example embodiments, the processor 140 may be implemented with a system on chip (SoC) that includes a central processing unit (CPU), a graphic processing unit (GPU), and a memory (e.g., a cache memory).

According to example embodiments, the processor 140 may determine the user's location by using the sensor 130. According to example embodiments, the processor 140 may determine the user's location by using the thermal sensor 131. According to example embodiments, the processor 140 may determine the user's location on the basis of the location of the user's touch input received through the touch sensor 133. For example, if the user's touch input is applied to the right side bezel (with respect to the direction in which the user views the display 110), the processor 140 may determine that the user is located at the right, and if the user's touch input is applied to the left side bezel, the processor 140 may determine that the user is located at the left. In another example, if the user's touch input is applied to the lower side bezel, the processor 140 may determine that the user is located in front of the display device 100.

According to example embodiments, the processor 140 may store the user's location information in the memory 120. If the user's location changes, the processor 140 may update the user's location information stored in the memory 120.

Figure 3:
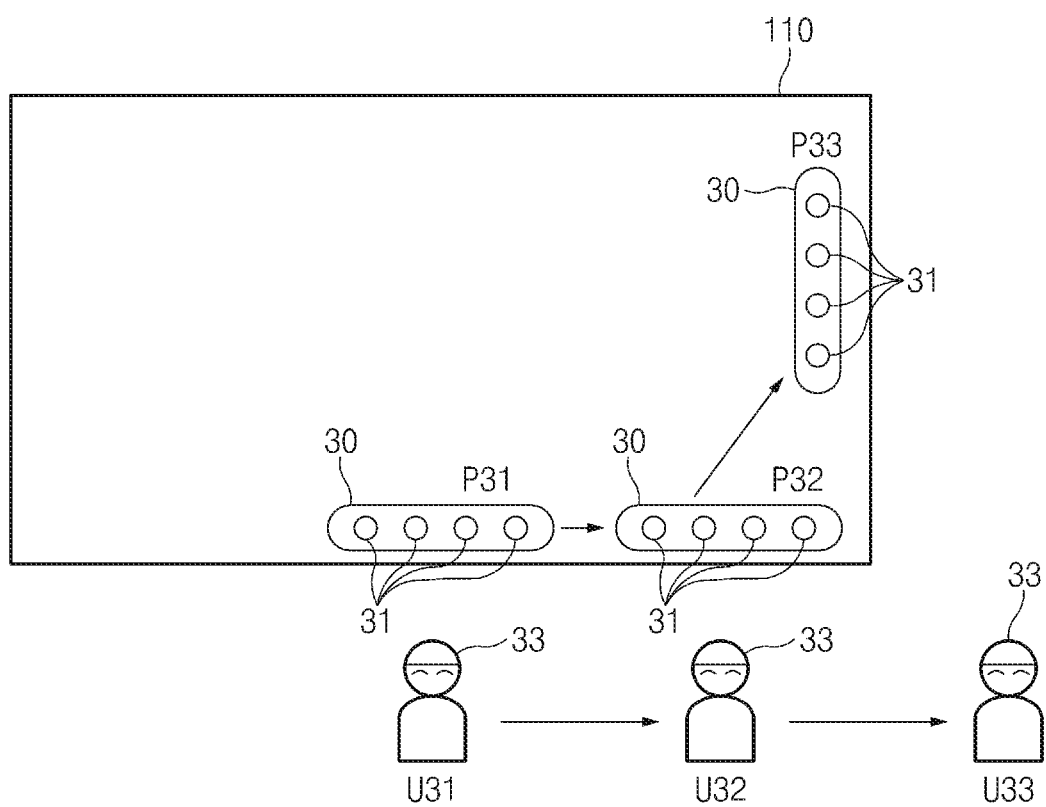
FIG. 3 is a diagram illustrating an example of moving a user interface, according to example embodiments.

FIG. 3 is a diagram illustrating an example of moving a user interface, according to example embodiments.

According to example embodiments, the processor 140 may display a user interface 30 on the display 110. According to example embodiments, the processor 140 may display the user interface 30 at the location corresponding to a location of a user 33. For example, if the location of the user 33 is determined to be a first location U31, the processor 140 may display the user interface 30 at a first location P31 on the display 110 that corresponds to the user's first location U31. If the user 33 moves from the first location U31 to a second location U32, the processor 140 may move the user interface 30 displayed on the display 110 from the first location P31 to a second location P32 corresponding to the user's second location U32. If the user 33 moves from the second location U32 to a third location U33, the processor 140 may move the user interface 30 displayed on the display 110 from the second location P32 to a third location P33 corresponding to the user's third location U33.

According to example embodiments, the processor 140 may change the direction in which a plurality of objects 31 included in the user interface 30 are arranged, depending on the location where the user interface 30 is displayed. For example, the processor 140 may horizontally arrange the plurality of objects 31 included in the user interface 30 in the case in which the user interface 30 is displayed at the first location P31 and the second location P32, and the processor 140 may vertically arrange the plurality of objects 31 included in the user interface 30 in the case in which the user interface 30 is displayed at the third location P33.

According to example embodiments, the processor 140 may change the direction in which the plurality of objects 31 included in the user interface 30 are arranged, depending on the location where a touch input is applied to the touch sensor 133. For example, the processor 140 may horizontally arrange the plurality of objects 31 included in the user interface 30 if the user's touch input is applied to the upper side bezel or the lower side bezel, and the processor 140 may vertically arrange the plurality of objects 31 included in the user interface 30 if the user's touch input is applied to the right side bezel or the left side bezel.

According to example embodiments, if a specified first user input is received through the sensor 130, the processor 140 may move the user interface 30 displayed on the display 110. For example, if the user's touch input is received for a specified period of time or the user's touch input having a specified strength or higher is received, the processor 140 may move the user interface 30 displayed on the display 110. In another example, if a specified first gesture (e.g., the user's gesture of clenching a first or moving a hand in the first direction) is recognized, the processor 140 may move the user interface 30 displayed on the display 110.

According to example embodiments, if a specified second user input is received in the state in which the user interface 30 is moved, the processor 140 may move the user interface 30 to the original location. For example, if the same touch input as the first user input is received again, the processor 140 may move the user interface 30 displayed on the display 110 to the original location. In another example, if a specified second gesture (e.g., the user's gesture of opening the first or moving the hand in the second direction opposite to the first direction) is recognized, the processor 140 may move the user interface 30 displayed on the display 110 to the original location.

Figure 4:
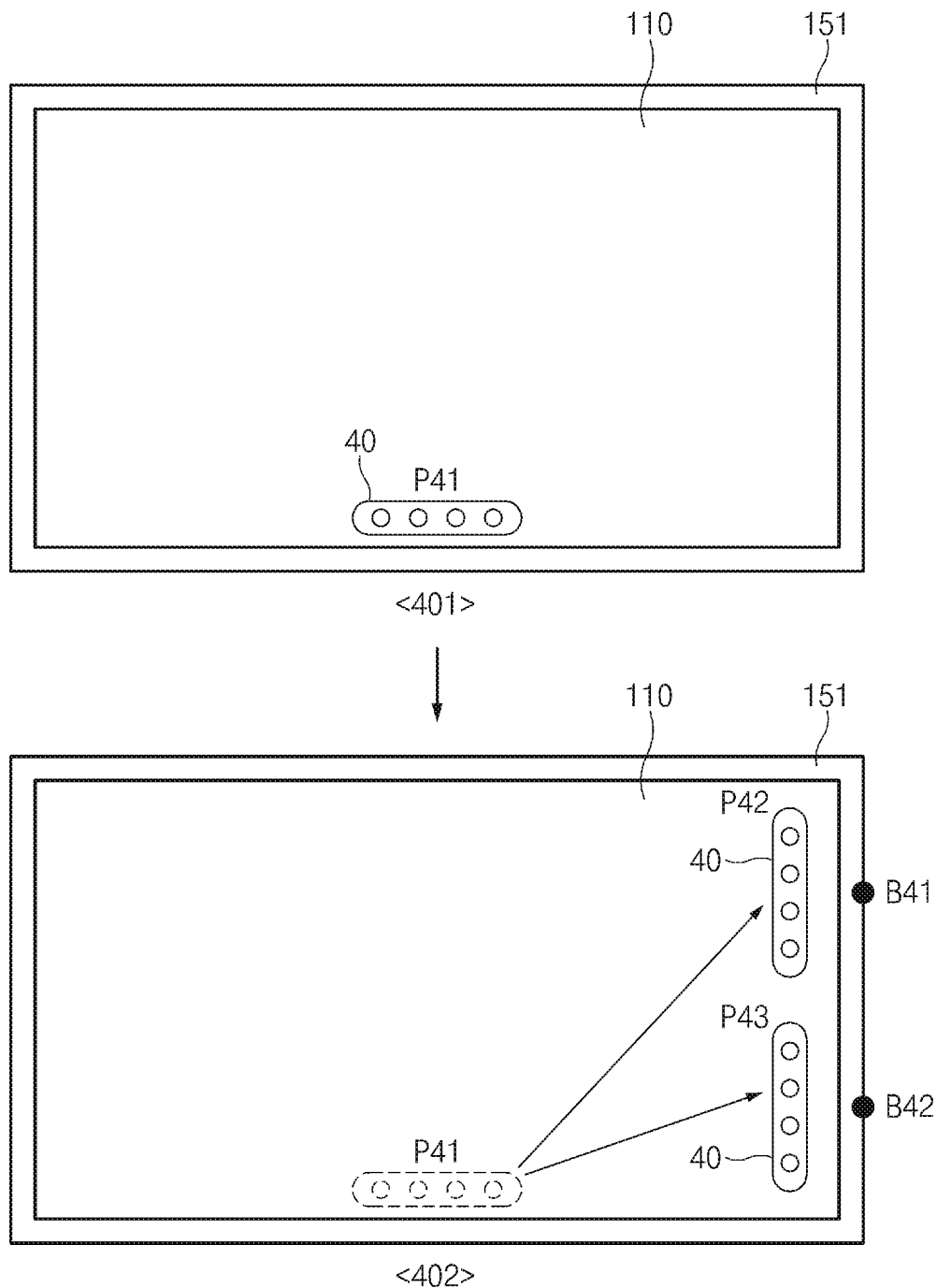
FIG. 4 is a diagram illustrating an example of moving a user interface, according to example embodiments.

FIG. 4 is a diagram illustrating an example of moving a user interface, according to example embodiments.

Referring to image <401> of FIG. 4, the processor 140 may display a user interface 40 on the display 110. For example, the processor 140 may display the user interface 40 at a first location P41 on the display 110 according to the location information of the user interface 40 stored in the memory 120.

Referring to image <402> of FIG. 4, the processor 140 may move the user interface 40 on the basis of the location where a touch input is applied to the touch sensor 133 disposed inward of the bezel 151. For example, if a user input is applied to a first location B41 of the bezel 151, the processor 140 may move the user interface 40 displayed on the display 110 from the first location P41 to a second location P42 corresponding to the first location B41 of the bezel 151. In another example, if a user input is applied to a second location B42 of the bezel 151, the processor 140 may move the user interface 40 displayed on the display 110 from the first location P41 to a third location P43 corresponding to the second location B42 of the bezel 151.

Figure 5:
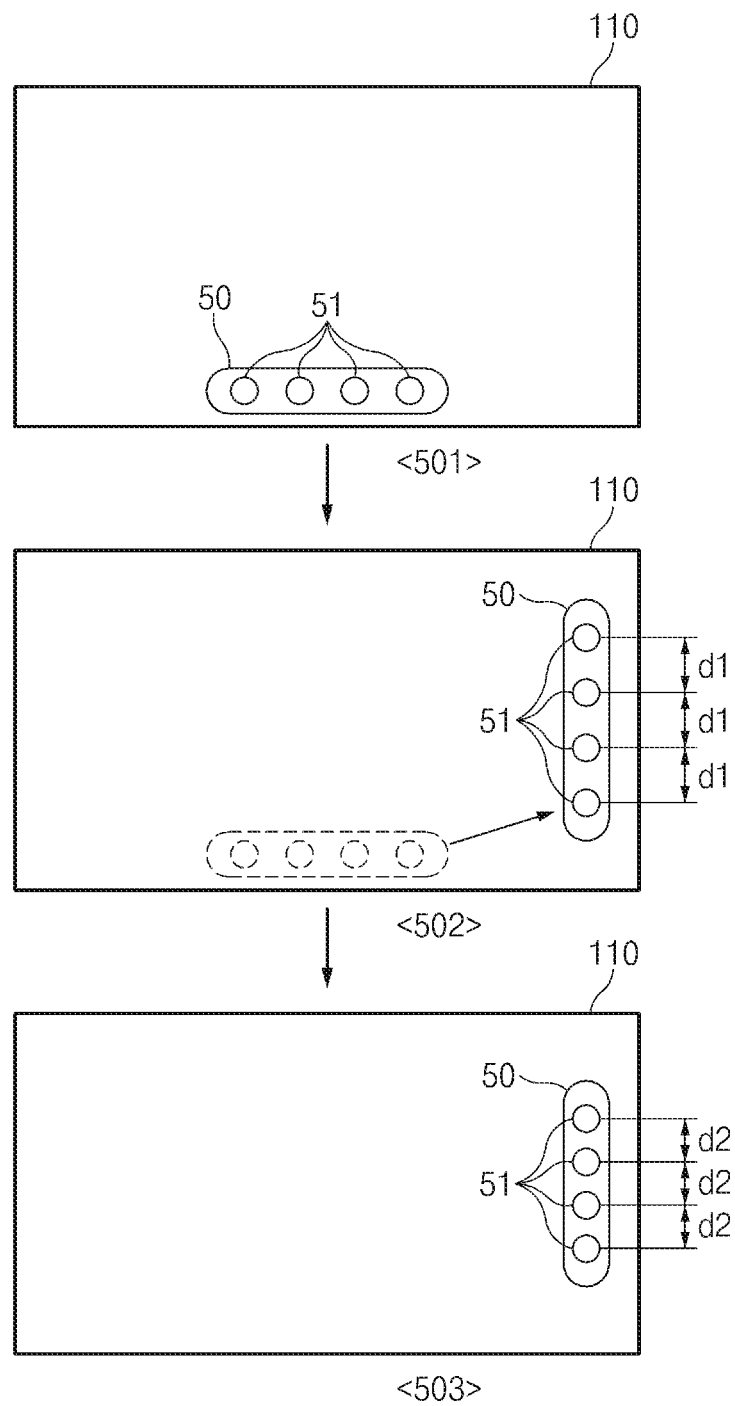
FIG. 5 is a diagram illustrating an example of moving a user interface, according to example embodiments.

FIG. 5 is a diagram illustrating an example of moving a user interface, according to example embodiments.

Referring to image <501> of FIG. 5, the processor 140 may display a user interface 50 on the display 110. The user interface 50 may include a plurality of objects 51. Referring to image <502> of FIG. 5, the processor 140 may move the user interface 50 displayed on the display 110 if a specified first user input is received. According to example embodiments, the plurality of objects 51 included in the user interface 50 may be arranged with a specified interval therebetween. For example, the processor 140 may arrange the plurality of objects 51 included in the user interface 50 at a first interval d1.

Referring to image <503> of FIG. 5, the processor 140 may change the interval between the plurality of objects 51 included in the user interface 50, based on duration time of the specified first user input (e.g., duration time of a touch input or a gesture input) or the strength of the specified first user input (e.g., the strength of the touch input). For example, in the case in which the duration time of the specified first user input exceeds a threshold time, or the strength of the specified first user input exceeds a threshold strength, the processor 140 may decrease the interval between the plurality of objects 51 from the first interval d1 to a second interval d2. In another example, the processor 140 may decrease the interval between the plurality of objects 51, with an increase in the duration time of the specified first user input. In another example, the processor 140 may decrease the interval between the plurality of objects 51, with an increase in the strength of the specified first user input.

Figure 6:
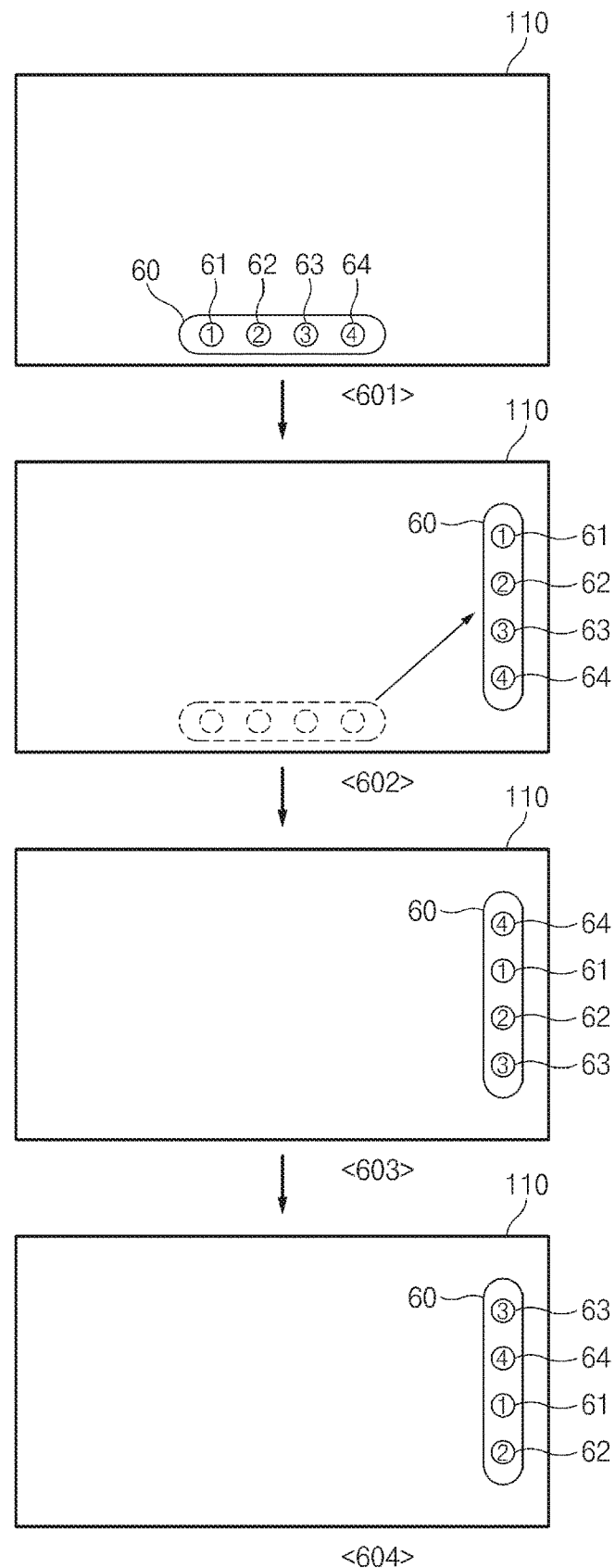
FIG. 6 is a diagram illustrating an example of moving a user interface, according to example embodiments.

FIG. 6 is a diagram illustrating an example of moving a user interface, according to example embodiments.

Referring to image <601> of FIG. 6, the processor 140 may display a user interface 60 on the display 110. The user interface 60 may include a plurality of objects 61, 62, 63, and 64. According to example embodiments, the plurality of objects 61, 62, 63, and 64 included in the user interface 60 may be arranged in a specified sequence. For example, the processor 140 may arrange the plurality of objects 61, 62, 63, and 64 in the sequence of the first object 61, the second object 62, the third object 63, and the fourth object 64.

Referring to image <602> of FIG. 6, the processor 140 may move the user interface 60 displayed on the display 110 if a specified first user input is received. The processor 140, when moving the user interface 60, may maintain the sequence in which the plurality of objects 61, 62, 63, and 64 are arranged.

Referring to image <603> of FIG. 6, the processor 140 may change the sequence in which the plurality of objects 61, 62, 63, and 64 included in the user interface 60 are arranged, based on duration time of the specified first user input (e.g., duration time of a touch input or a gesture input) or the strength of the specified first user input (e.g., the strength of the touch input). For example, if the duration time of the specified first user input exceeds a first threshold time (e.g., 1 second), or the strength of the specified first user input exceeds a first threshold strength, the processor 140 may arrange the plurality of objects 61, 62, 63, and 64 in the sequence of the fourth object 64, the first object 61, the second object 62, and the third object 63.

Referring to image <604> of FIG. 6, the processor 140 may continuously change the sequence in which the plurality of objects 61, 62, 63, and 64 included in the user interface 60 are arranged, based on the duration time of the specified first user input (e.g., duration time of a touch input or a gesture input) or the strength of the specified first user input (e.g., the strength of the touch input). For example, if the duration time of the specified first user input exceeds a second threshold time (e.g., 2 seconds), or the strength of the specified first user input exceeds a second threshold strength, the processor 140 may arrange the plurality of objects 61, 62, 63, and 64 in the sequence of the third object 63, the fourth object 64, the first object 61, and the second object 62. According to example embodiments, if the receipt of the specified first user input is stopped, the processor 140 may maintain the plurality of objects 61, 62, 63, and 64 in the arrangement state at the time when the receipt of the specified first user input is stopped.

Figure 7:
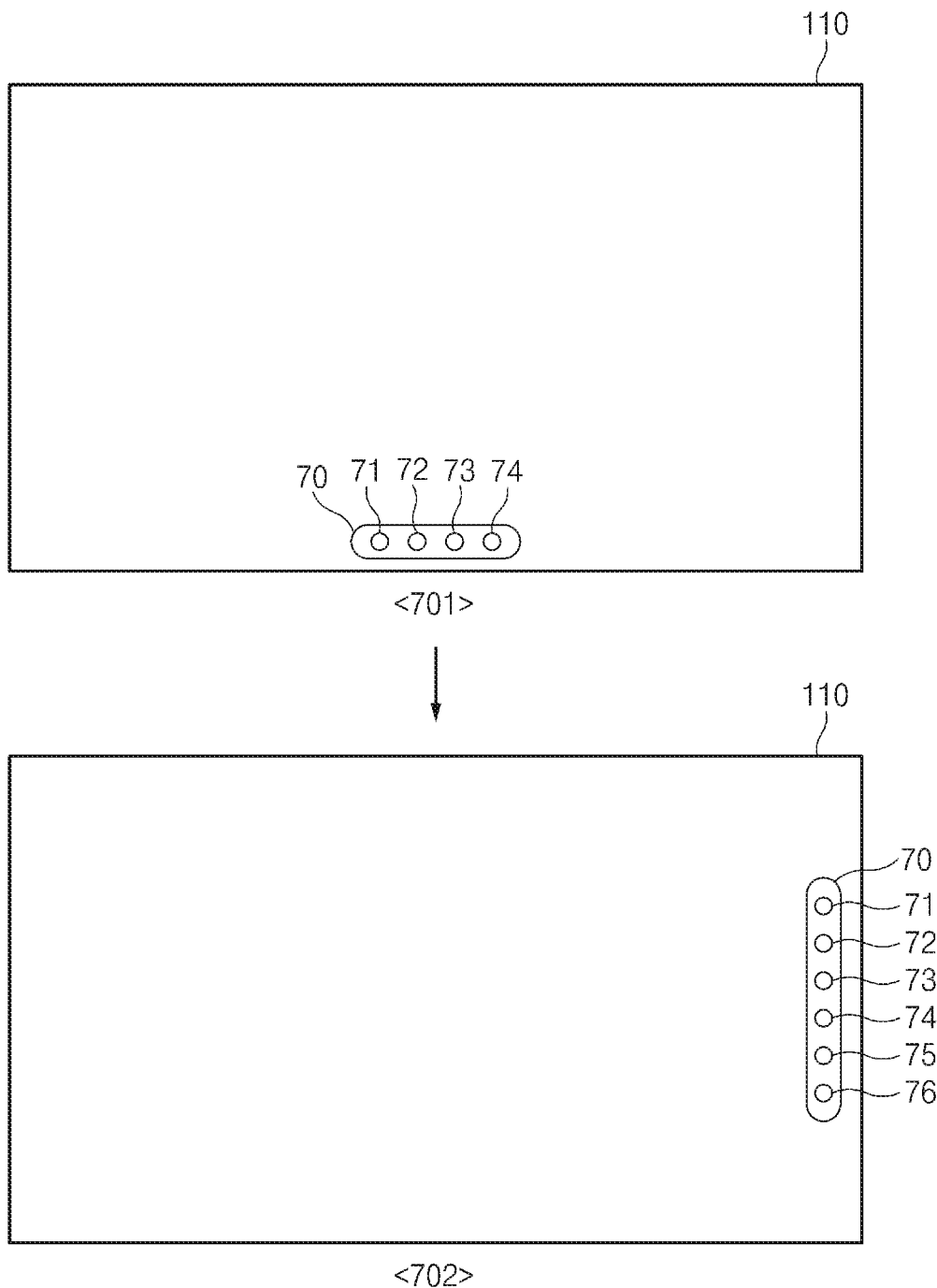
FIG. 7 is a diagram illustrating an example of moving a user interface, according to example embodiments.

FIG. 7 is a diagram illustrating an example of moving a user interface, according to example embodiments.

Referring to image <701> of FIG. 7, the processor 140 may display a user interface 70 on the display 110. The user interface 70 may include a plurality of objects 71, 72, 73, and 74.

Referring to image <702> of FIG. 7, the processor 140 may move the user interface 70 displayed on the display 110 if a specified first user input is received. According to example embodiments, the processor 140 may additionally display objects relating to the user interface 70, based on duration time of the specified first user input (e.g., duration time of a touch input or a gesture input) or the strength of the specified first user input (e.g., the strength of the touch input). For example, if the duration time of the specified first user input exceeds a first threshold time (e.g., 1 second), or the strength of the specified first user input exceeds a first threshold strength, the processor 140 may additionally display, on the user interface 70, a fifth object 75 and a sixth object 76 relating to the user interface 70. The objects 75 and 76 relating to the user interface 70 may be, for example, hidden objects not being displayed on the display 110 according to a user's setting or the number of times that the objects are selected.

Figure 8:
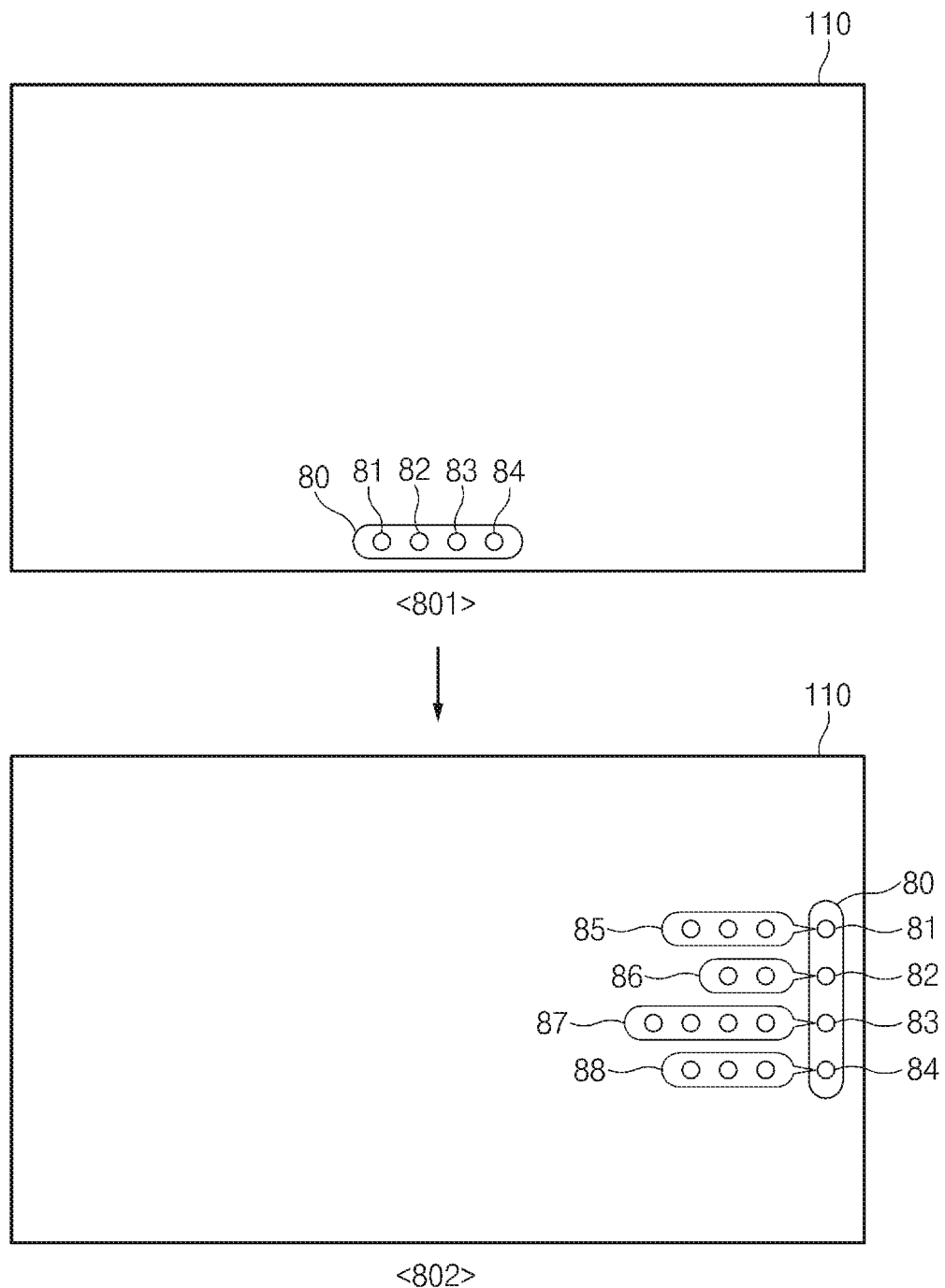
FIG. 8 is a diagram illustrating an example of moving a user interface, according to example embodiments.

FIG. 8 is a diagram illustrating an example of moving a user interface, according to example embodiments.

Referring to image <801> of FIG. 8, the processor 140 may display a user interface 80 on the display 110. The user interface 80 may include a plurality of objects 81, 82, 83, and 84.

Referring to image <802> of FIG. 8, the processor 140 may move the user interface 80 displayed on the display 110 if a specified first user input is received. According to example embodiments, the processor 140 may additionally display sub-user interfaces of the user interface 70, based on duration time of the specified first user input (e.g., duration time of a touch input or a gesture input) or the strength of the specified first user input (e.g., the strength of the touch input). For example, if the duration time of the specified first user input exceeds a first threshold time (e.g., 1 second), or the strength of the specified first user input exceeds a first threshold strength, the processor 140 may display a sub-user interface 85 of the first object 81, a sub-user interface 86 of the second object 82, a sub-user interface 87 of the third object 83, and a sub-user interface 88 of the fourth object 84. The plurality of objects 81, 82, 83, and 84 included in the user interface 80 may be a selection menu, and the sub-user interfaces 85, 86, 87, and 88 may include sub-selection menus of the plurality of objects 81, 82, 83, and 84, respectively.

Figure 9:
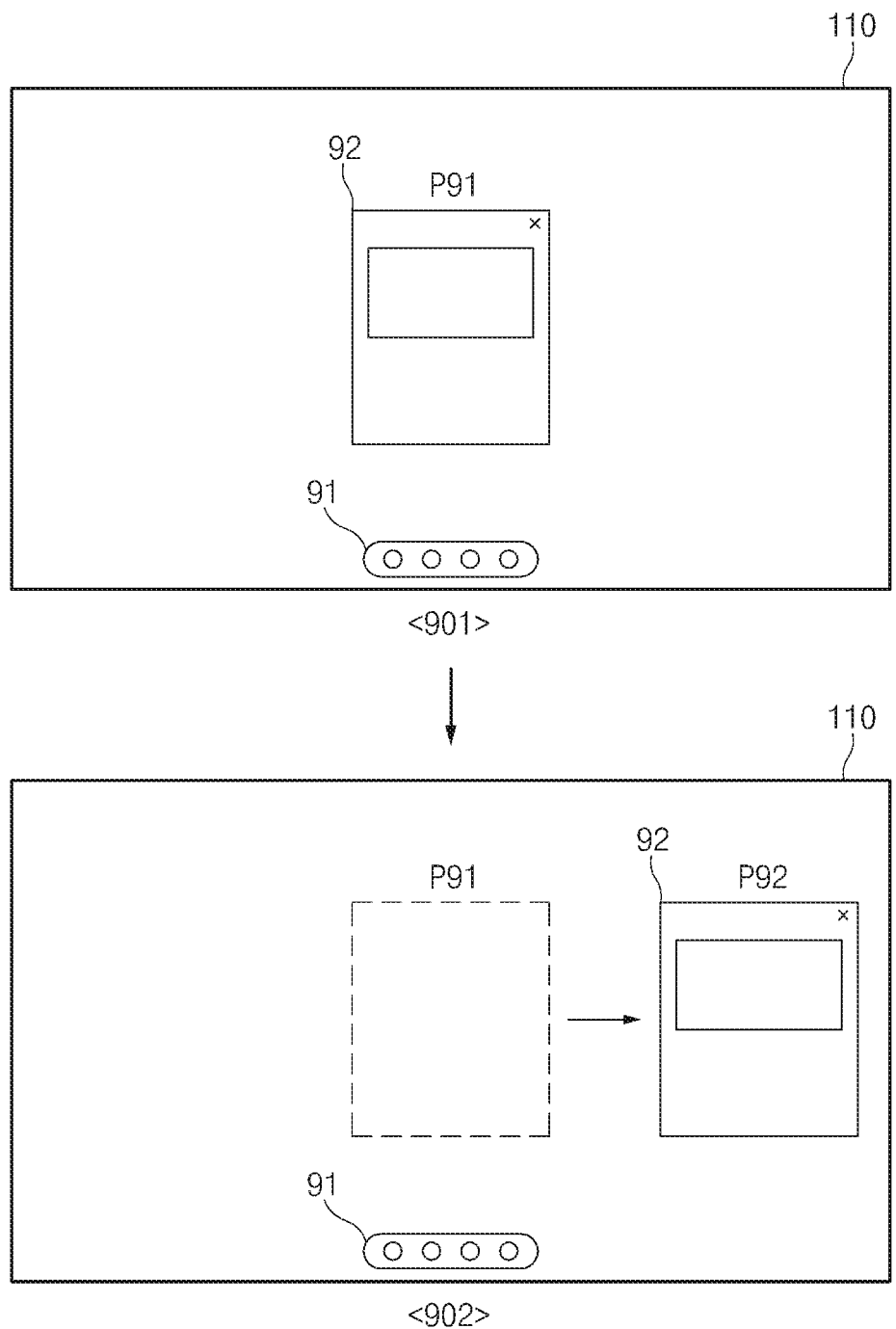
FIG. 9 is a diagram illustrating an example of moving a user interface, according to example embodiments.

FIG. 9 is a diagram illustrating an example of moving a user interface, according to example embodiments.

Referring to image <901> of FIG. 9, the processor 140 may display a first user interface 91 on the display 110. The first user interface 91 may be, for example, a user interface that includes a selection menu for selecting a plurality of functions provided by the display device 100. The processor 140 may display a second user interface 92 on the display 110 after the first user interface 91 is displayed. The second user interface 92 may be, for example, a user interface, such as a pop-up window, which is temporarily displayed on the display 110.

Referring to image <902> of FIG. 9, the processor 140 may move either one or both of the first user interface 91 and the second user interface 92 displayed on the display 110 if a specified first user input is received. According to example embodiments, the processor 140 may move the most recently displayed user interface (e.g., the second user interface 92) of the plurality of user interfaces 91 and 92 displayed on the display 110. For example, the processor 140 may move the second user interface 92 from a first location P91 to a second location P92 if the specified first user input is received.

An unnecessary pop-up window may be displayed while the display device 100 is being used by a user. To end the pop-up window, the user may move to the location where the pop-up window is displayed, or may move the pop-up window in the direction in which the user is located. According to the example embodiments described with reference to FIG. 9, the user may conveniently end the pop-up window by moving the pop-up window in the direction in which the user is located, without moving another user interface.

Figure 10:
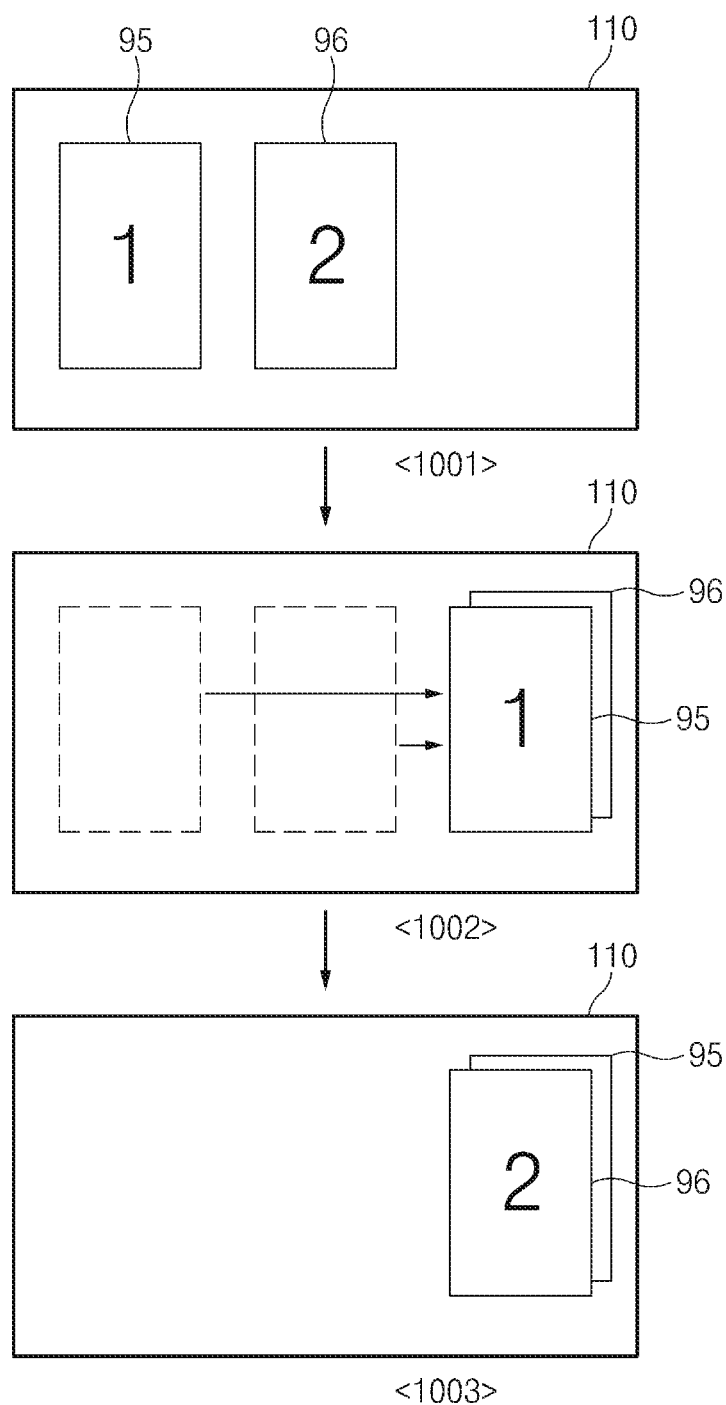
FIG. 10 is a diagram illustrating an example of moving a user interface, according to example embodiments.

FIG. 10 is a diagram illustrating an example of moving a user interface, according to example embodiments.

Referring to image <1001> of FIG. 10, the processor 140 may display a first user interface 95 and a second user interface 96 on the display 110.

Referring to image <1002> of FIG. 10, the processor 140 may move the first user interface 95 and the second user interface 96 displayed on the display 110 if a specified first user input is received. According to example embodiments, the processor 140 may allow the first user interface 95 and the second user interface 96 to overlap each other. For example, the processor 140 may allow at least an area of the first user interface 95 and at least an area of the second user interface 96 to overlap each other and may display the first user interface 95 on the second user interface 96.

Referring to image <1003> of FIG. 10, the processor 140 may change the sequence in which the first user interface 95 and the second user interface 96 overlap each other, based on duration time of the specified first user input (e.g., duration time of a touch input or a gesture input) or the strength of the specified first user input (e.g., the strength of the touch input). For example, if the duration time of the specified first user input exceeds a first threshold time (e.g., 1 second), or the strength of the specified first user input exceeds a first threshold strength, the processor 140 may display the second user interface 96 on the first user interface 95 by changing the sequence in which the first user interface 95 and the second user interface 96 overlap each other.

In the case in which a user moves a plurality of user interfaces displayed on a display in the direction in which the user is located, the user may be placed in a situation in which the user has to overlap the user interfaces. According to the example embodiment described with reference to FIG. 10, the user may effectively control the plurality of user interfaces even at a fixed location by changing the sequence in which the plurality of user interfaces overlap one another.

The example embodiments described with reference to FIGS. 3 to 10 may be independently performed, but the example embodiments may be simultaneously performed. For example, the processor 140 may move a user interface depending on a user's location or the location where a touch input is received, and may simultaneously change any one or any combination of the interval between a plurality of objects included in the user interface and the direction and sequence in which the plurality of objects are arranged.

Figure 11:
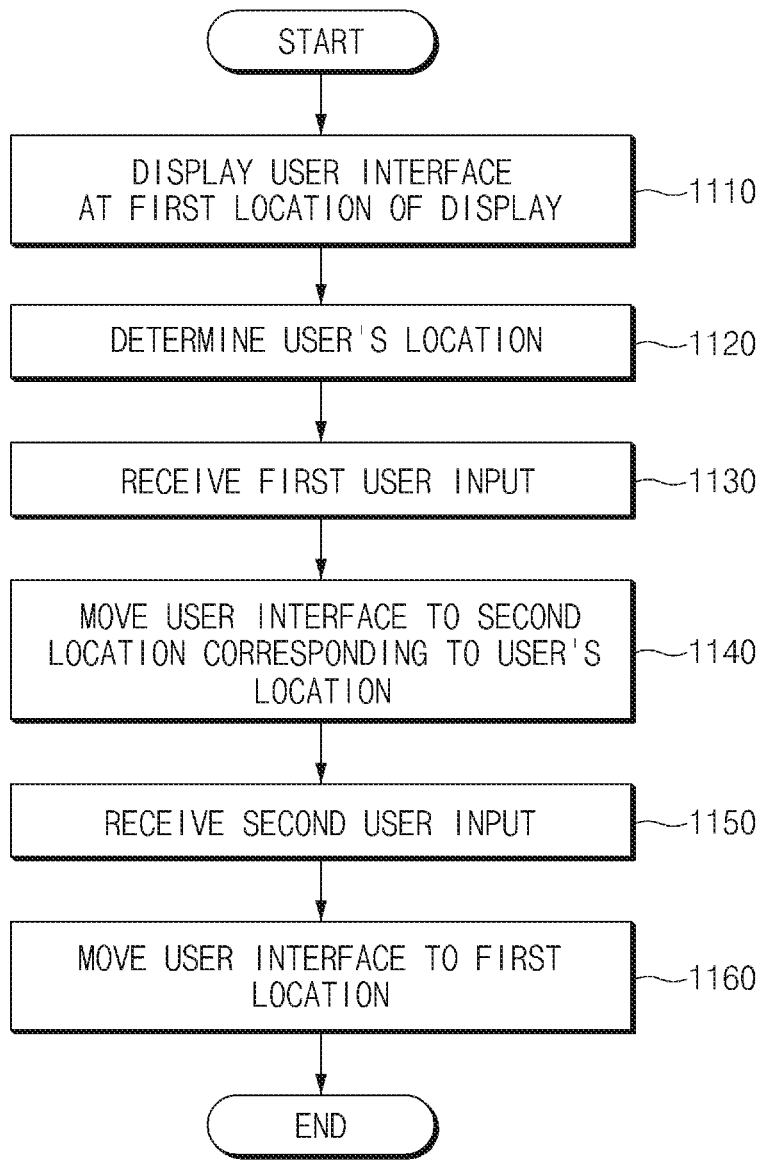
FIG. 11 is a flowchart illustrating a user interface displaying method of a display device, according to example embodiments.

FIG. 11 is a flowchart illustrating a user interface displaying method of a display device, according to example embodiments.

The flowchart illustrated in FIG. 11 may include operations processed by the above-described display device 100. Accordingly, although omitted in the following description, the contents set forth in relation to the display device 100 with reference to FIGS. 1 to 10 may also be applied to the flowchart illustrated in FIG. 11.

According to example embodiments, in operation 1110, the display device 100 may display a user interface at a first location of the display 110. For example, the display device 100 may display the user interface at the first location according to the location information of the user interface stored in the memory 120.

According to example embodiments, in operation 1120, the display device 100 may determine a user's location. According to example embodiments, the display device 100 may determine the user's location by using the thermal sensor 131. According to example embodiments, the display device 100 may determine the user's location on the basis of the location of the user's touch input received through the touch sensor 133.

According to example embodiments, in operation 1130, the display device 100 may receive a specified first user input. For example, the display device 100 may receive the user's touch input for a specified period of time, or may receive the user's touch input having a specified strength or higher. In another example, the display device 100 may recognize a specified first gesture (e.g., the user's gesture of clenching a fist or moving a hand in the first direction).

According to example embodiments, if the specified first user input is received, the display device 100 may, in operation 1140, move the user interface to a second location corresponding to the user's location.

According to example embodiments, the user interface may include a plurality of objects. According to example embodiments, the display device 100 may change the direction in which the plurality of objects included in the user interface are arranged, depending on the second location where the user interface is displayed. According to example embodiments, the display device 100 may change the direction in which the plurality of objects included in the user interface are arranged, depending on the location where a touch input is applied to the touch sensor 133.

According to example embodiments, the display device 100 may change the interval between the plurality of objects included in the user interface, based on duration time of the specified first user input (e.g., duration time of a touch input or a gesture input) or the strength of the specified first user input (e.g., the strength of the touch input). According to example embodiments, the display device 100 may change the sequence in which the plurality of objects included in the user interface are arranged, based on the duration time or strength of the specified first user input. According to example embodiments, the display device 100 may additionally display an object relating to the user interface or a sub-user interface of the user interface, based on the duration time or strength of the specified first user input.

According to example embodiments, if a plurality of user interfaces are displayed on the display 110, the display device 100 may move, to the second location, the most recently displayed user interface of the plurality of user interfaces. According to example embodiments, if a plurality of user interfaces are displayed on the display 110, the display device 100 may move all of the plurality of user interfaces to the second location. The display device 100 may allow at least some of the plurality of user interfaces moved to the second location to overlap one another. According to example embodiments, the display device 100 may change the sequence in which the plurality of user interfaces overlap one another, based on the duration time or strength of the specified first user input.

According to example embodiments, in operation 1150, the display device 100 may receive a specified second user input. For example, the display device 100 may receive the user's touch input for a specified period of time, or may receive the user's touch input having a specified strength or higher. In another example, the display device 100 may recognize a specified second gesture (e.g., the user's gesture of opening the fist or moving the hand in the second direction).

According to example embodiments, if the specified second user input is received, the display device 100 may, in operation 1160, move the user interface to the first location. According to example embodiments, if the specified second user input is received, the display device 100 may reverse the direction and sequence in which the plurality of objects included in the user interface are arranged and the interval between the plurality of objects, as well as the location of the user interface.

At least a part of apparatuses (e.g., modules or functions thereof) or methods (e.g., operations) according to the example embodiments may be implemented by instructions stored in computer-readable storage media in the form of a program module. The instructions, when executed by a processor, may allow the processor to perform functions corresponding to the instructions. The computer-readable storage media may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an internal memory, or the like. The instructions may include codes generated by a compiler or codes executable on a computer using an interpreter.

The example embodiments disclosed herein are provided to describe technical details of the present disclosure and to help the understanding of the present disclosure, and are not intended to limit the scope of the present disclosure. Therefore, it may be construed that all modifications and changes or other example embodiments based on the technical idea of the present disclosure fall within the scope of the present disclosure.

While the present disclosure has been shown and described with reference to the example embodiments thereof, it will be understood by those skilled in the art that various changes in form and details may be made therein without departing from the spirit and scope of the present disclosure as defined by the appended claims and their equivalents.

What is claimed is:

1. A display device comprising:
a housing configured to form an external appearance of the display device;
a display exposed through the housing;
a bezel configured to form a part of the housing and disposed along a periphery of the display;
a touch sensor disposed inward of the bezel and configured to receive a touch input from a user; and
a processor configured to:
control the display to display a user interface at a first location of the display corresponding to a first location of the bezel, wherein the user interface includes a plurality of objects and the plurality of objects are arranged in a first direction based on the first location of the display; and
in response to a first touch input being received while the user interface is displayed at the first location of the display:
determine a second location of the bezel where the first touch input is received, wherein the second location of the bezel is different from the first location of the bezel;
control the display to move the user interface that is displayed; to a second location of the display, the second location of the display corresponding to the second location of the bezel;

control the display to change the first direction in which the plurality of objects included in the user interface are arranged, based on the second location of the display; and control the display to display sub selection menus of each of the plurality of objects, wherein the processor is further configured to, in response to the first touch input exceeding a threshold time duration, control the display to display one or more additional objects in the user interface or a sub-user interface of the user interface, wherein the one or more additional objects are objects other than the plurality of objects, and wherein the one or more additional objects are displayed according to a number of times the one or more additional objects are selected by the user.

2. The display device of claim 1, wherein the user interface includes a first user interface and a second user interface, and wherein the processor is further configured to, in response to the first touch input being received while the user interface is displayed at the first location, control the display to display a first portion of the first user interface overlapping a second portion of the second user interface based on a second time duration of the first touch input being received.

3. The display device of claim 1, further comprising a pressure sensor disposed inward of the bezel and configured to detect a strength of the first touch input, wherein the processor is further configured to, in response to the first touch input being received while the user interface is displayed at the first location, control the display to change at least one from among an interval between the plurality of objects and a sequence in which the plurality of objects are arranged, based on a first strength of the first touch input being detected.

4. The display device of claim 1, further comprising a pressure sensor disposed inward of the bezel and configured to detect a strength of the first touch input, wherein the user interface includes a first user interface and a second user interface, and wherein the processor is further configured to, in response to the first touch input being received while the user interface is displayed at the first location, control the display to display a first portion of the first user interface overlapping a second portion of the second user interface based on a second strength of the first touch input being detected.

5. The display device of claim 1, wherein the user interface includes a first user interface and a second user interface, and wherein the processor is further configured to, in response to the first touch input being received while the user interface is displayed at the first location, control the display to move a most recently displayed user interface among the first user interface and the second user interface, to the second location.

6. The display device of claim 1, wherein the touch sensor is further configured to receive, from the user, a second touch input, and wherein the processor is further configured to, in response to the second touch input being received while the user interface is displayed at the second location, control the display to move the user interface that is displayed, to the first location.

7. The display device of claim 1, further comprising a motion recognition sensor configured to detect a first gesture and a second gesture of the user, wherein the processor is further configured to control the display to:

in response to the first gesture being detected while the user interface is displayed at the first location, move the user interface that is displayed, to the second location; and in response to the second gesture being detected while the user interface is displayed at the second location, move the user interface that is displayed, to the first location.

8. The display device of claim 7, wherein the processor is further configured to, in response to the first gesture being detected while the user interface is displayed at the first location, change at least one from among an interval between the plurality of objects and a sequence in which the plurality of objects are arranged, based on a first time duration of the first gesture being detected.

9. The display device of claim 7, wherein the user interface includes a first user interface and a second user interface, and wherein the processor is further configured to, in response to the first gesture being detected while the user interface is displayed at the first location, control the display to display a first portion of the first user interface overlapping a second portion of the second user interface based on a second time duration of the first gesture that is detected.

10. A user interface displaying method of a display device, the method comprising:

displaying a user interface at a first location of a display corresponding to a first location of a bezel, wherein the user interface includes a plurality of objects and the plurality of objects are arranged in a first direction based on the first location of the display;

receiving, from a user, a first touch input at a touch location of a touch sensor disposed inward of the bezel that forms a part of a housing forming an external appearance of the display device, the bezel being disposed along a periphery of the display; and in response to the first touch input being received while the user interface is displayed at the first location of the display:

determining a second location of the bezel where the first touch input is received, wherein the second location of the bezel is different from the first location of the bezel;

moving the user interface that is displayed, to a second location of the display, the second location of the display corresponding to the second location of the bezel;

changing the first direction in which the plurality of objects included in the user interface are arranged, based on the second location of the display; and displaying sub selection menus of each of the plurality of objects, wherein, in response to the first touch input exceeding a threshold time duration, controlling the display to display one or more additional objects in the user interface or a sub-user interface of the user interface, wherein the one or more additional objects are objects other than the plurality of objects, and wherein the one or more additional objects are displayed according to a number of times the one or more additional objects are selected by the user.

11. The method of claim 10, wherein the user interface includes a first user interface and a second user interface, and
wherein the method further comprises, in response to the first touch input being received while the user interface is displayed at the first location:
displaying a first portion of the first user interface overlapping a second portion of the second user interface based on a second time duration of the first touch input that is received.

12. The method of claim 10, further comprising:
detecting a strength of the first touch input through a pressure sensor disposed inward of the bezel; and
in response to the first touch input being received while the user interface is displayed at the first location, changing at least one from among an interval between the plurality of objects and a sequence in which the plurality of objects are arranged, based on a first strength of the first touch input that is detected.

13. The method of claim 10, wherein the user interface includes a first user interface and a second user interface, and
wherein the method further comprises:
detecting a strength of the first touch input through a pressure sensor disposed inward of the bezel; and
in response to the first touch input being received while the user interface is displayed at the first location, displaying a first portion of the first user interface overlapping a second portion of the second user interface based on a second strength of the first touch input being detected.

14. A non-transitory computer-readable storage medium storing a program comprising executable instructions, which when executed by a processor, cause the processor to perform a user interface displaying method of a display device, the method comprising:
displaying a user interface at a first location of a display corresponding to a first location of a bezel, wherein the user interface includes a plurality of objects and the plurality of objects are arranged in a first direction based on the first location of the display;
receiving, from a user, a first touch input at a touch location of a touch sensor disposed inward of the bezel that forms a part of a housing forming an external appearance of the display device, the bezel being disposed along a periphery of the display;
in response to the first touch input being received while the user interface is displayed at the first location of the display:
determining a second location of the bezel where the first touch input is received, wherein the second location of the bezel is different from the first location of the bezel;
moving the user interface that is displayed; to a second location of the display, the second location of the display corresponding to the second location of the bezel;
changing the first direction in which the plurality of objects included in the user interface are arranged, based on the second location of the display; and
displaying sub selection menus of each of the plurality of objects,
wherein, in response to the first touch input exceeding a threshold time duration, controlling the display to display one or more additional objects in the user interface or a sub-user interface of the user interface,
wherein the one or more additional objects are objects other than the plurality of objects, and
wherein the one or more additional objects are displayed according to a number of times the one or more additional objects are selected by the user.

* * * * *